United States Patent
Kim et al.

(10) Patent No.: US 9,949,158 B2
(45) Date of Patent: Apr. 17, 2018

(54) METHOD AND APPARATUS FOR CONTROLLING MEASUREMENT GAPS OF SERVING CELLS IN MOBILE COMMUNICATION SYSTEM

(71) Applicant: Samsung Electronics Co., Ltd., Suwon-si, Gyeonggi-do (KR)

(72) Inventors: Sangbum Kim, Suwon-si (KR); Soenghun Kim, Suwon-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 14/653,109

(22) PCT Filed: Dec. 23, 2013

(86) PCT No.: PCT/KR2013/012021
§ 371 (c)(1),
(2) Date: Jun. 17, 2015

(87) PCT Pub. No.: WO2014/098538
PCT Pub. Date: Jun. 26, 2014

(65) Prior Publication Data
US 2015/0341815 A1    Nov. 26, 2015

(30) Foreign Application Priority Data
Dec. 21, 2012  (KR) .................. 10-2012-0150505

(51) Int. Cl.
*H04L 12/66* (2006.01)
*H04W 72/00* (2009.01)
(Continued)

(52) U.S. Cl.
CPC ............. *H04W 24/10* (2013.01); *H04L 1/00* (2013.01); *H04L 41/0803* (2013.01);
(Continued)

(58) Field of Classification Search
CPC ............. H04W 24/10; H04W 72/042; H04W 72/0453; H04W 88/02; H04L 41/0803; H04L 1/00; H04B 7/2656
See application file for complete search history.

(56) References Cited

U.S. PATENT DOCUMENTS

2008/0318577 A1    12/2008 Somasundaram et al.
2011/0080962 A1    4/2011 Blankenship et al.
(Continued)

FOREIGN PATENT DOCUMENTS

JP    2010-516185 A    5/2010
WO    2012/087360 A1   6/2012
WO    WO 2012092792 A1 *  7/2012    ........ H04W 36/0088

OTHER PUBLICATIONS

Qualcomm Incorporated: "Indication of need for measurement gaps in carrier aggregation", 3GPP Draft; R2-106284, 3rd Generation Partnership Project (3GPP), Mobile Competence Centre; 650, Route Des Lucioles; F-06921 Sophia-Antipolis Cedex; France, vol. RAN WG2, no. Jacksonville, USA; XP050492204, Nov. 2010.
(Continued)

*Primary Examiner* — Kiet Tang
(74) *Attorney, Agent, or Firm* — Jefferson IP Law, LLP

(57) ABSTRACT

One embodiment of the present invention relates to a measuring method of terminal and a measurement information configuration method of a base station in a mobile communication system, and provides a measuring method and a measuring apparatus of a terminal and a configuration method and a configuration apparatus of a base station for configuring information in the terminal, the measurement method comprising the steps of: transmitting, to the base station, the terminal equipment information message including information for configuring measurement gaps with respect to a plurality of frequency bands; receiving from the base station, the measurement gap configuration information set on the basis of the information included in the terminal information message; and measuring according to the measurement gap configuration information.

18 Claims, 13 Drawing Sheets

(51) Int. Cl.
*H04W 24/10* (2009.01)
*H04W 72/04* (2009.01)
*H04L 12/24* (2006.01)
*H04L 1/00* (2006.01)
*H04W 88/02* (2009.01)
*H04B 7/26* (2006.01)

(52) U.S. Cl.
CPC ..... *H04W 72/042* (2013.01); *H04W 72/0453* (2013.01); *H04B 7/2656* (2013.01); *H04W 88/02* (2013.01)

(56) References Cited

U.S. PATENT DOCUMENTS

| | | |
|---|---|---|
| 2012/0113866 A1 | 5/2012 | Tenny et al. |
| 2012/0178465 A1* | 7/2012 | Lin ................. H04W 24/10 455/450 |
| 2012/0182896 A1 | 7/2012 | Jang et al. |
| 2013/0242796 A1* | 9/2013 | Chen ................. H04W 36/0088 370/252 |
| 2015/0208262 A1* | 7/2015 | Siomina ................. H04W 64/00 370/252 |

OTHER PUBLICATIONS

Huawei et al: "Measurement Gap in Rel-10", 3GPP Draft; R2-110111 Measurement Gap in Rel-10, 3rd Generation Partnership Project(3GPP), Mobile Competence Centre; 650, Route Des Lucioles; F-06921 Sophia-Antipolis Cedex; France, vol. RAN WG2, no. Dublin, Ireland; XP050492897, Jan. 2011.

Alcatel-Lucent et al: "Measurement gaps handling", 3GPP Draft; R2-110295 Measurement GAPSV0.4, 3rd Generation Partnership Project(3GPP), Mobile Competence Centre; 650, Route Des Lucioles; F-06921 Sophia-Antipolis Cedex; France, vol. RAN WG2, no. Dublin, Ireland; XP050492981, Jan. 2011.

Huawei et al: "Discussion on the inter-frequency requirement for CA capability UE without GAP", 3GPP Draft; R4-122659, 3rd Generation Partnership Project (3GPP), Mobile Competence Centre; 650, Route Des Lucioles; F-06921 Sophia-Antipolis Cedex; France, vol. RAN WG4, no. Prague, Czech Republic; May 21, 2012-May 25, 2012, XP050613985, May 2012.

* cited by examiner

FIG. 6

```
-- ASN1START

MeasGapConfig ::=        CHOICE {
    release                  NULL,
    setup                    SEQUENCE {
        gapOffset                CHOICE {
            gp0                      INTEGER(0..39),
            gp1                      INTEGER(0..79),
            ...
        }
    }
}

-- ASN1STOP
```

*MeasGapConfig* information element

METHOD AND APPARATUS FOR CONTROLLING MEASUREMENT GAPS OF SERVING CELLS IN MOBILE COMMUNICATION SYSTEM

BACKGROUND OF THE INVENTION

1. Field of the Invention

The present invention relates to a method and apparatus for effectively controlling measurement gaps of serving cells having different TDD configuring information in a carrier aggregation technology of a mobile communication system.

2. Description of the Related Art

In general, mobile communication systems have been developed to provide a communication service to users while they are moving. With the rapid development of technology, mobile communication systems have been developed to provide data communication services at a high speed, as well as voice communication.

In recent years, Long Term Evolution Advanced (LTE-A) that has been developed as a next generation mobile communication system is in process of standardization by the $3^{rd}$ Generation Partnership Project (3GPP). LTE is a technology to implement high speed packet-based communication. LTE-A is a technology that is being developed to be commercialized in about 2012, implementing high speed packet-based communication with a transmission rate of maximum 100 Mbps higher than the data transmission rate on current technology. To this end, various proposals have been discussed. As an example, a scheme has been proposed to reduce the number of nodes on communication paths by simplifying network architecture. Another scheme has been proposed to apply wireless protocols to wireless channels.

Meanwhile, unlike voice services, resources, etc. that can be allocated for data services are determined according to the channel status and the amount of data to be transmitted. In wire communication systems such as mobile communication systems, schedulers perform transmission resource management, such as allocation of transmission resources, etc., considering the amount of resources for transmission, the channel status, the amount of data, etc. These are also carried out in the same as LTE as one of the next generation mobile communication systems, and a scheduler located in an evolved Node B (eNB) may manage and allocate wireless transmission resources.

Recently, serious discussions have been made on LTE-Advanced (LTE-A) that enhances the transmission rate by adding various new technologies to LTE communication systems. One of the technologies to be introduced is carrier aggregation as a typical example. Carrier aggregation refers to a technology that increases the number of carriers in communication between user equipment (UE) and an evolved Node B (eNB) to employ from only one carrier in conventional art to a primary carrier and one or more secondary carriers, thereby increasing the amount of transmission by the number of secondary carriers. In LTE technology, a cell where a primary carrier is served is called a Primary Cell (PCell) and a cell where a secondary carrier is served is called a Secondary Cell (SCell).

SUMMARY OF THE INVENTION

The present invention has been made in view of the above problems, and provides a method and apparatus for effectively controlling measurement gaps of serving cells having different TDD configuring information in a carrier aggregation technology of a mobile communication system.

In accordance with an exemplary embodiment of the present invention, the present invention provides a measurement method of a terminal in a mobile communication system including: transmitting, to a base station, a terminal information message including information for configuring measurement gaps with respect to a plurality of frequency bands; receiving, from the base station, measurement gap configuration information set based on information included in the terminal information message; and performing a measurement according to the measurement gap configuration information.

In accordance with another exemplary embodiment of the present invention, the present invention provides a method of controlling measurement gap configuration of a terminal in a mobile communication system including: receiving, from the terminal, a terminal information message including information that the terminal uses to configure measurement gaps with respect to a plurality of frequency bands; and transmitting, to the terminal, measurement gap configuration information set based on information included in the terminal information message.

In accordance with another exemplary embodiment of the present invention, the present invention provides a measurement apparatus of a mobile communication system including: a transceiver for transmitting/receiving messages and data to/from a base station; and a controller for: transmitting, to the base station, a terminal information message including information for configuring measurement gaps with respect to a plurality of frequency bands; receiving, from the base station, measurement gap configuration information set based on information included in the terminal information message; and performing a measurement.

In accordance with another exemplary embodiment of the present invention, the present invention provides an apparatus for controlling measurement gap configuration of a terminal in a mobile communication system including: a transceiver for transmitting/receiving messages and data to/from the terminal; and a controller for: receiving, from the terminal, a terminal information message including information that the terminal uses to configure measurement gaps with respect to a plurality of frequency bands; and transmitting, to the terminal, measurement gap configuration information set based on information included in the terminal information message.

BRIEF DESCRIPTION OF THE DRAWINGS

The features and advantages of the invention will become more apparent from the following detailed description in conjunction with the accompanying drawings, in which:

FIG. 6 is a view of a configuration of measurement gap configuration information;

DETAILED DESCRIPTION OF EXEMPLARY EMBODIMENTS

Hereinafter, exemplary embodiments of the present invention are described in detail with reference to the accompanying drawings. Detailed descriptions of well-known functions and structures incorporated herein may be omitted to avoid obscuring the subject matter of the invention. The terms or words described in the description and the claims should not be limited by a general or lexical meaning, instead should be analyzed as a meaning and a concept through which the inventor defines and describes the invention to the best of his/her ability, to comply with the idea of the invention.

In the following description, embodiments of the present invention will be explained in detail based on OFDM-based wireless communication systems, particularly, 3GPP EUTRA standard; however, it will be appreciated to those skilled in the art that the subject matter of the present invention may be applied to other communication systems that include the similar technical background and channel types as the present invention without departing from the scope of the present invention.

The present invention relates to a method and apparatus for effectively controlling measurement gaps of serving cells having different TDD configuring information in a carrier aggregation technology of a mobile communication system.

Figure 1:
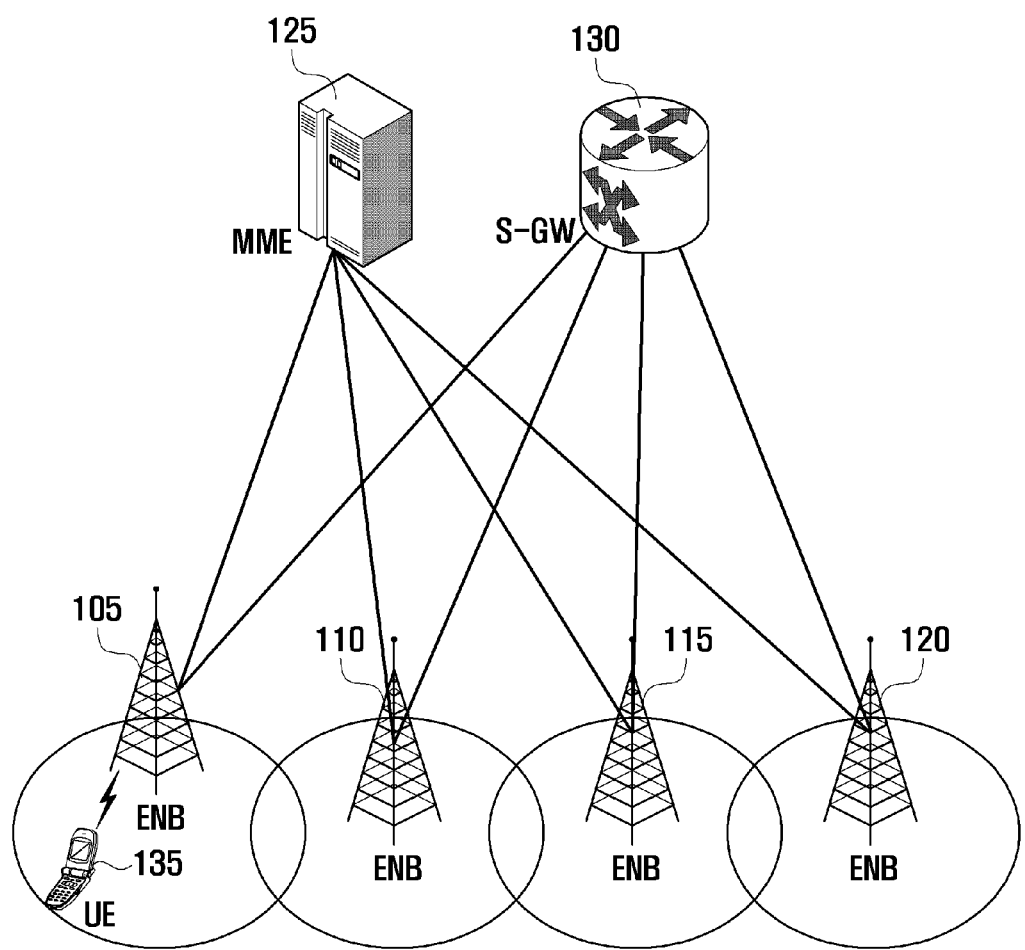
FIG. 1 is a view of the configuration of an LTE system according to the present invention.

FIG. 1 is a view of the configuration of an LTE system according to the present invention.

Referring to FIG. 1, the LTE system configures the wireless access network, including Evolved Node Bs (ENBs) 105, 110, 115, and 120, a Mobility Management Entity (MME) 125, and a Serving-Gateway (S-GW) 130. User equipment (UE) 135 is connected to an external network via ENBs 105 to 120 and S-GW 130.

ENBs 105 to 120 correspond to conventional Node B of the UMTS system. ENBs 105 to 120 are connected to UE 135 via wireless channels, performing more complicated functions than conventional Node B. In LTE system, since real-time Voice over IP (VoIP) services and all user traffics are served via shared channels, devices are required to collect information regarding states, such as buffer states of UE, available transmission power states, channel states, etc., and to make a schedule. This job is performed via ENBs 105 to 120. One ENB 105, 110, 115 or 120 controls a plurality of cells. For example, in order to implement a transmission rate of 100 Mbps, LTE systems employ Orthogonal Frequency Division Multiplexing (OFDM), as a wireless access technology, at a bandwidth of 20 MHz. LTE systems also employ Adaptive Modulation & Coding (AMC) to determine modulation scheme and channel coding rate, meeting with the channel state of UE.

S-GW 130 is a device that provides data bearers. S-GW 130 creates or removes data bearers according to the control of MME 125. MME 125 manages the mobility of UE and controls a variety of functions. MME 125 connects to a plurality of ENBs.

Figure 2:
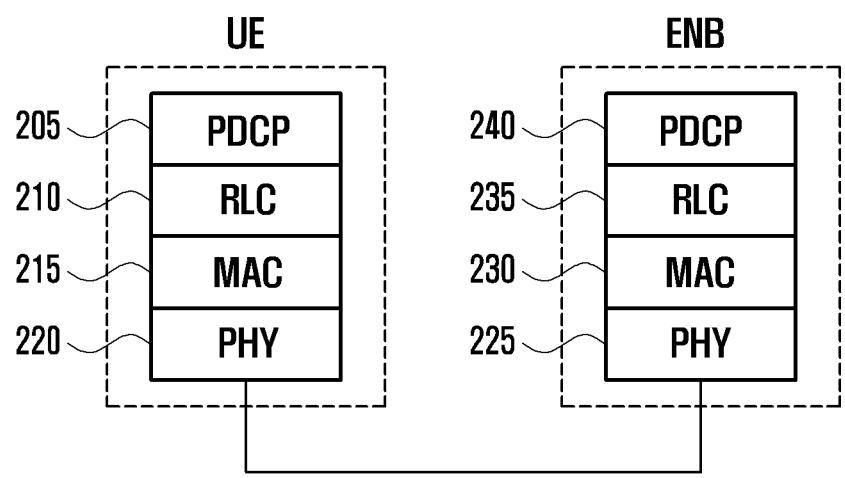
FIG. 2 is a view of the wireless protocol stack of an LTE system according to the present invention.

FIG. 2 is a view of the wireless protocol stack of an LTE system according to the present invention.

Referring to FIG. 2, in the wireless protocol of an LTE system, UE and ENB have Packet Data Convergence Protocol (PDCP) 205 and 240, Radio Link Control (RLC) 210 and 235, and Medium Access Control (MAC) 215 and 230, respectively.

PDCP 205 and 240 perform compression/decompression of IP header. RLC 210 and 235 reconfigure PDCP packet data unit (PDU) in proper size. MAC 215 and 230 connect to a number of RLC layer devices configured in one UE device. MAC 215 and 230 multiplex RLC PUDs to MAC PDU and de-multiplex RLC PDUs from MAC PDU. Physical layers (PHY) 220 and 225 channel-code and modulate data from the upper layers, create OFDM symbols, and transmit them via a wireless channel. In addition, PHY 220 and 225 demodulate and channel-decode OFDM symbols transmitted via a wireless channel, and transfer them to the upper layers. In order to correct additional errors, PHY 220 and 225 also use Hybrid Automatic Repeat Request (HARQ), and the reception node transmits a one check bit indicating whether it has received packets from a transmission node, which is called HARQ ACK/NACK. Downlink HARQ ACK/NACK for Uplink transmission may be transmitted via Physical Hybrid-ARQ Indicator Channel. Uplink HARQ ACK/NACK for Downlink transmission may be transmitted via Physical Uplink Control Channel (PUCC) or Physical Uplink Shared Channel (PUSCH).

Figure 3:
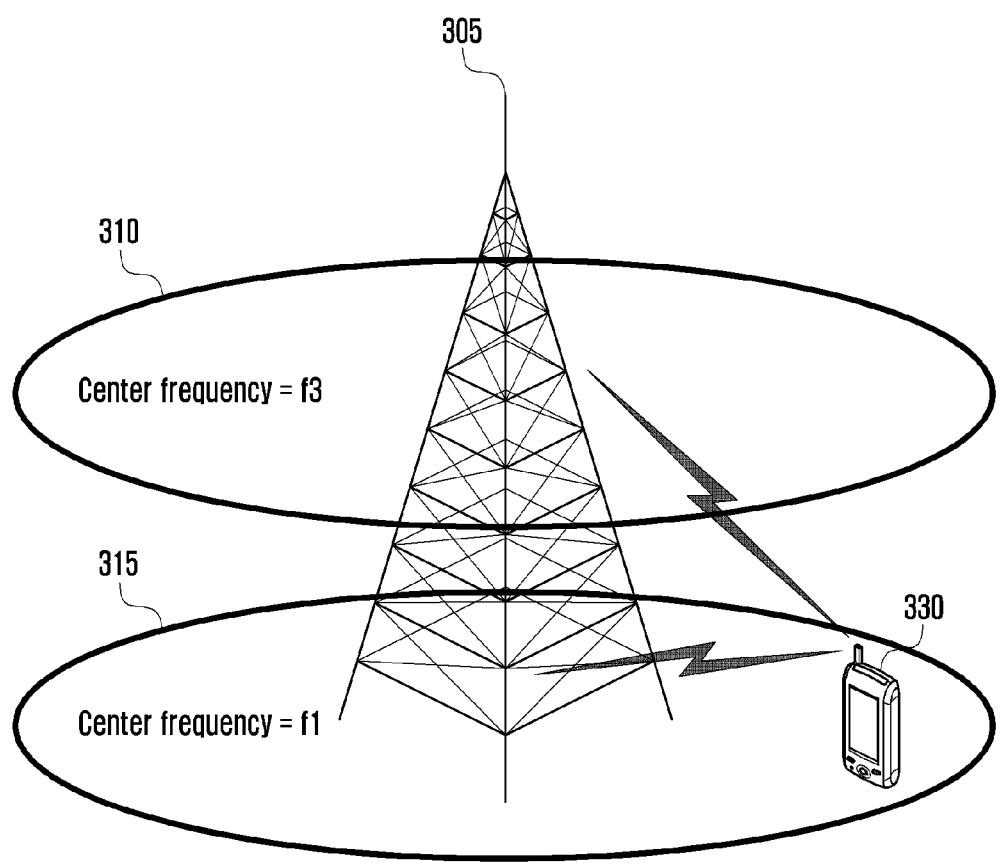
FIG. 3 is a view that describes carrier aggregation in user equipment (UE)

FIG. 3 is a view that describes carrier aggregation in user equipment (UE).

Referring to FIG. 3, an ENB broadcasts/receives multi-carriers over frequency bands. For example, when an ENB 305 broadcasts a carrier 315 of center frequency f1 and a carrier 310 of center frequency f3, conventional art allows UE 330 to transmit/receive data via one of the carriers 315 and 310; however, the invention allows UE 330 that can perform carrier aggregation to simultaneously transmit/receive data using a number of carriers. ENB 305 can allocate more carriers to UE 330 that can perform carrier aggregation, so that the UE 330 can increase the data transmission rate.

If it is assumed that one cell is formed by one forward carrier and one reverse carrier that are each transmitted/received from/by one ENB, carrier aggregation according to conventional art may be understood as UE simultaneously transmits/receives data via a number of cells. In that case, the maximum transmission rate may increase in proportional to the number of aggregated carriers.

In the following description, receiving data by UE via a forward carrier or transmitting data by UE via a reverse carrier means that data is received/transmitted via a control channel and a data channel provided by a cell corresponding to a frequency band and a center frequency characterizing the carrier. For the sake of convenience, the following embodiment of the present invention will be described based on LTE system. However, it should be understood that the invention can be applied to all types of wireless communication systems that support carrier aggregation.

LTE standard supports double duplex, Frequency Division Duplex (FDD) and Time Division Duplex (TDD). FDD has different frequency bands for Uplink and Downlink. TDD uses the same frequency band for Uplink and Downlink. Therefore, TDD must use the same frequency band, alternatively, as a frequency band for Uplink during a specific subframe and as a frequency band for Downlink during another subframe. UE must precisely know subframes that are used for Uplink and Downlink respectively; and ENB provides the information about subframes to the UE before the UE uses the frequency band for Uplink and Downlink. Subframe information used as Uplink and Downlink is called TDD configuration. ENB may provide UE with one of the seven TDD configurations in total as shown in the following table 1.

TABLE 1

| Up-link-downlink configuration | Downlink-to-Uplink Switch point periodicity | Subframe numbers | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Subframes are categorized into uplink subframe, downlink subframe, and special subframe, based on TDD configurations. As described in table 1, downlink subframe denoted by the letter 'D' is used to transmit downlink data, and uplink subframe denoted by 'U' is allocated to transmit uplink data. Special subframe corresponds to a subframe between a downlink subframe and an uplink subframe. The reason why a special subframe is reserved is because, according to locations of UE, there is a difference between the timings that UE has completely received a downlink subframe and the timing that UE transmits uplink data. For example, UE relatively far apart from an ENB receives data from the ENB at a low rate. On the contrary, in order for an ENB to receive data from UE within a preset period of time, the UE must start to transmit the data earlier. On the contrary, this does not require a special subframe between an uplink subframe and a downlink subframe.

Figure 4:
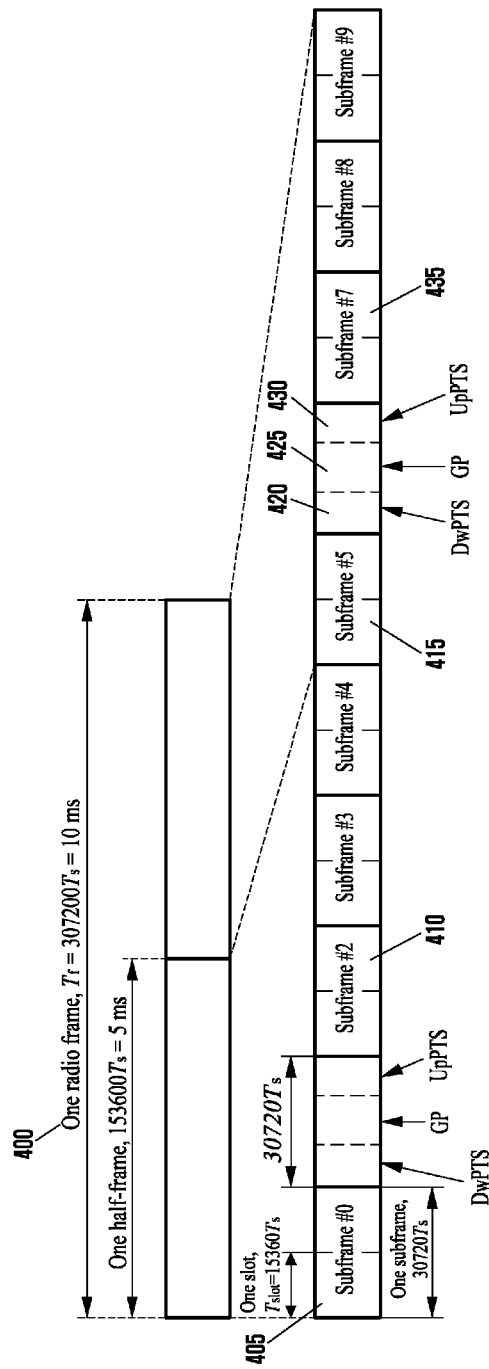
FIG. 4 is a view that describes a frame structure of a TDD system.

FIG. 4 is a view that describes a frame structure of a TDD system. One radio frame 400 is 10 ms long and includes 10 subframes. Each subframe is 1 ms long and includes two slots. Referring to FIG. 4, subframe #0 (reference number 405) and subframe #5 (reference number 415) are downlink subframes and subframe #2 (reference number 410) and subframe #7 (reference number 435) are uplink subframes, which is one of the TDD configurations 0, 1, 2, and 6 described in table 1. Therefore, there are special subframes between subframes #0 and #2 and between subframes #5 and #7.

A special subframe is divided into three intervals, Downlink Pilot TimeSlot (DwPTS) 420, Guard Period (GP) 425 and Uplink Pilot TimeSlot (UpPTS) 430. The DwPTS is a time interval for receiving downlink and the UpPTS is a time interval for transmitting uplink. The GP is an interval where no transmission/reception occurs. The optimal DWPTS and UpPTS values may vary according to the environments of propagation. Therefore, ENB previously informs UE of proper DwPTS value and UpPTS values described in the following table 2. The TDD configurations of table 1 and the DwPTS and UpPTS values of table 2 are included in TDD configuration information, IE Tdd-Config), about system information block type 1, SystemInformationBlockType 1 (SIB 1), broadcast from the ENB and transmitted to the UE.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In LTE standard, measurement gaps are used to perform measurement of inter-frequency or inter-RAT networks. UE does not transmit/receive data to/from ENB in a measurement gap but performs measurement of inter-frequency or inter-RAT networks.

Figure 5:
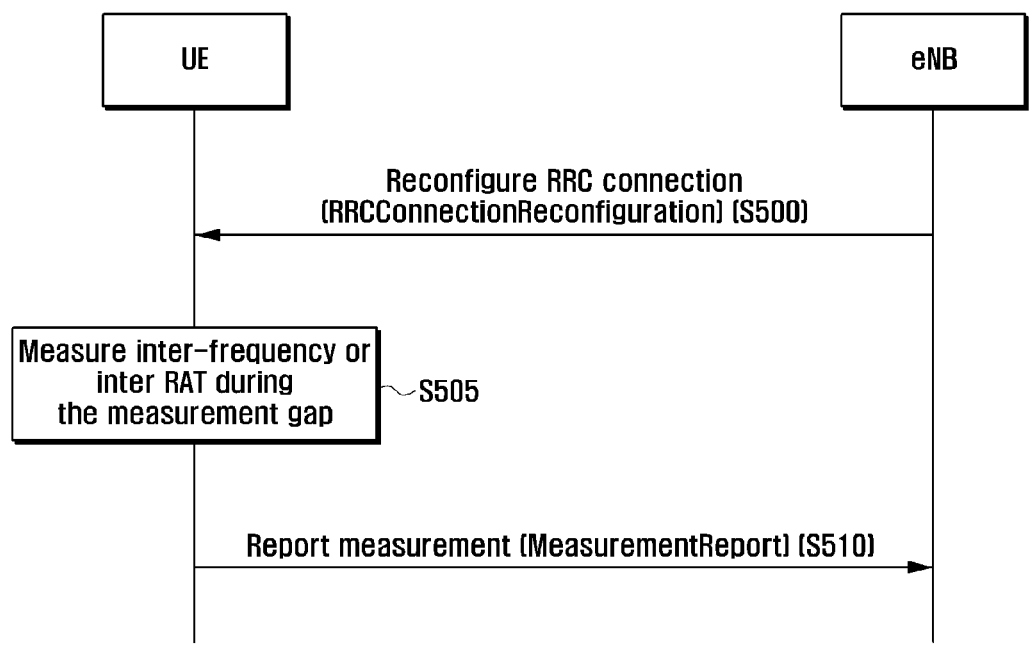
FIG. 5 is a view that describes operations of UE according to the present invention.

FIG. 5 is a flow chart that describes a process of performing measurement of inter-frequency or inter-RAT networks in UE by using measurement gaps. ENB configures a measurement gap by using a RRC connection reconfiguration message, RRCConnectionReconfiguration (S500). RRCConnectionReconfiguration may include measurement gap configuration information, IE MeasGapConfig (S500).

FIG. 6 is a view of a configuration of measurement gap configuration information. Referring to FIG. 6, the measurement gap configuration information includes information about a period of a measurement gap and information about a start subframe of a measurement gap. More specifically, measurement gap employs one of the two patterns as follows. One pattern is 'gp0' with a period of 40 ms. Another pattern is 'gp1' with a period of 80 ms. The period of a measurement gap is called Measurement Gap Repetition Period (MGRP). The measurement gap configuration information also provides a gap offset that is used to calculate a start subframe of a measurement gap along with the MGRP.

A radio frame and subframe are determined by the following Equations 1 and 2 when a measurement gap is performed.

$$SFN \bmod T = FLOOR(gapoffset/10) \quad \text{Equation 1}$$

$$subframe = gapOffset \bmod 10 \quad \text{Equation 2}$$

In the equations, system frame number (SFN) is used to indicate a radio frame where a measurement gap is performed and has a range of 0~1023. T is MGRP/10.

Referring back to FIG. 5, UE performs measurement of inter-frequency or inter-RAT networks at the subframe in the radio frame, determined by the equations described above, as a start point (S505). UE reports measured information to ENB by using a measurement report message, MeasurementReport (S510).

Figure 7:
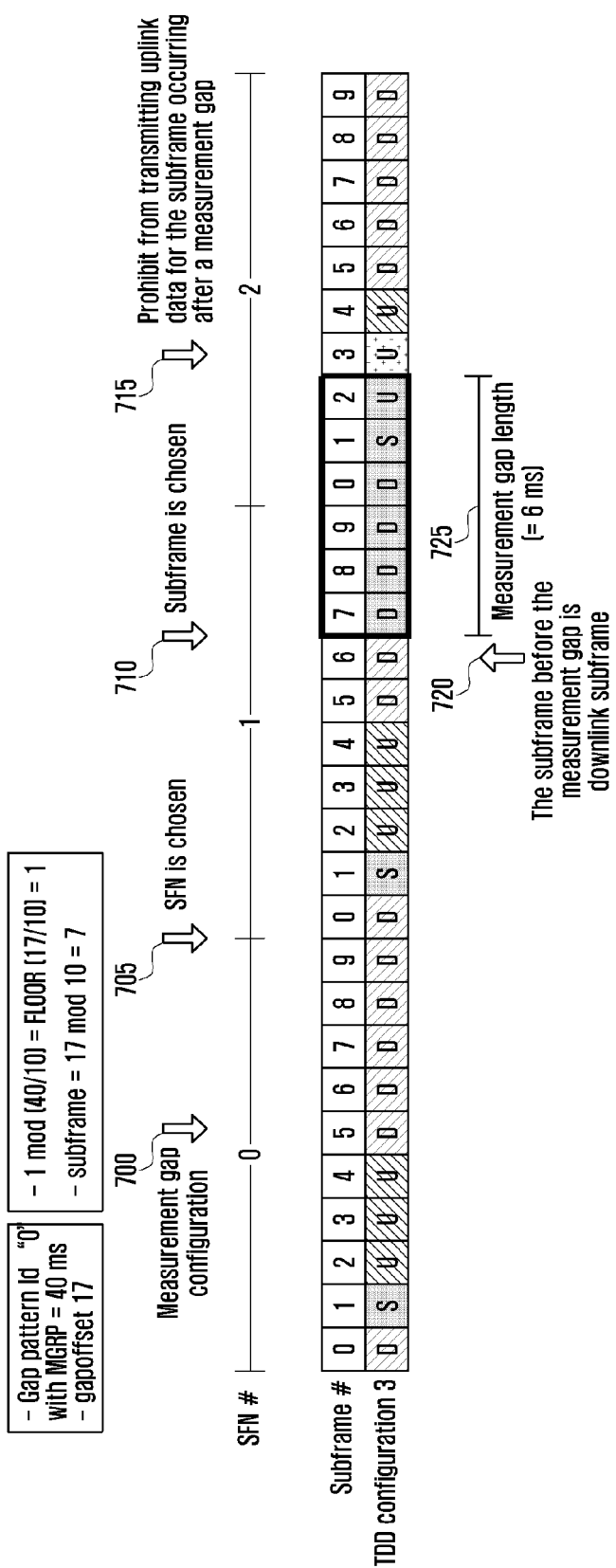
FIG. 7 is a view that describes a process of determining a subframe and a radio frame where a measurement gap is measured in TDD.

FIG. 7 is a view that describes a process of determining subframe and a radio frame where a measurement gap is measured in TDD.

Referring to FIG. 7, there are three radio frames where SFN=0, 1, and 2. The arrows indicate time points that specific operations are performed. The subframes are formed, corresponding to TDD configuration 3 described in Table 1.

At a time point labeled by reference number 700, UE receive measurement gap configuration information from ENB through a radio frame of SNF=0. The measurement gap configuration information includes information in which the measurement gap has a 'gp0' pattern, i.e., MGRP of 40 ms, and the gap offset value is set to 17.

The number of the radio frame performed in the measurement gap is determined by Equation 1. The number of the radio frame number derived by Equation 1 is 1 which is consistent with the SFN of the next radio frame, i.e., 1. Therefore, a measurement gap will start at a time point 705 in a radio frame with SFN=1.

In addition, the number of the subframe at which a measurement gap starts is calculated by Equation 2. Since the number of the subframe calculated by Equation 2 is seven, a measurement gap starts at a time point 710 from the $7^{th}$ subframe in a radio frame with SFN=1. The measurement gap length, labeled by reference number 725, is 6 ms; that is, the measurement gap length 725 is fixed as 6 subframes. UE performs measurement of inter-frequency or inter-RAT networks during the measurement gap 725.

Transmission of a subframe by UE at 715 after the measurement gap is restricted according specific condition. More specifically, if a subframe right before the beginning of a measurement gap is a downlink subframe, transmission of data from UE to ENB is restricted in the subframe after the end of the measurement gap. This reflects a possibility that the reception of downlink data transmitted from ENB may come over to the measurement gap in a subframe right before the beginning of the measurement gap due to the reception delay according to locations of UE. Therefore, in order to guarantee a measurement gap of 6 ms, if a subframe right before the beginning of the measurement gap is a downlink subframe, data transmission is restricted in a subframe after the end of the measurement gap. As shown in FIG. 7, since a subframe at 720 right before the beginning of a measurement gap at 725 is a downlink subframe D, transmission of data from UE to ENB is restricted in the subframe at 715 after the end of the measurement gap at 725.

As described above, the present invention provides a method of effectively controlling measurement gaps of serving cells with different TDD configurations when applying measurement gap configurations to UE capable of performing carrier aggregation.

LTE standard employs the concept of a frequency band (frequency bandwidth or serving cell) as described in the following table 3. LTE carrier belongs to one frequency band. The parameters applied to the calculation of transmission power to UE vary according to frequency bands. In carrier aggregation, carriers that belong to the same band or different bands may be used together. Therefore, in order to support carrier aggregation, UE may be implemented in such a way to include a plurality of Radio Frequency (RF) modules. When carriers that UE will use belong to bands adjacent to each other in frequency, they may be used by the same RF module. In contrast, when carriers that UE will use belong to bands far apart from to each other in frequency, they must be used by different RF modules. This is because the performance characteristic of RF modules varies considerably according to frequency band to use.

TABLE 3

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
| --- | --- | --- | --- |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |

TABLE 3-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

NOTE
[1]Band 6 is not applicable

In a state where carriers that UE will use belong to bands adjacent to each other in frequency and are used by the same RF module, when carriers performs measurement gap, corresponding carriers are all restricted to transmit or receive data during the measurement gap. That is, since carriers that belong to one RF module are separated, they cannot perform measurement gap. In contrast, in a state where carriers that UE will use belong to bands far apart from to each other in frequency and are used by a plurality of RF modules, it is not preferred that measurement gap for all carriers is performed. This is because measurement gap restricts transmission/reception of data and lowers the throughput. Therefore, if measurement of inter-frequency or inter-RAT networks is performed by applying measurement gap to carriers that uses only one RF module, the performance degradation of throughput may be prevented. Therefore, the present invention provides a method of controlling measurement gaps by frequency bands.

Figure 8:
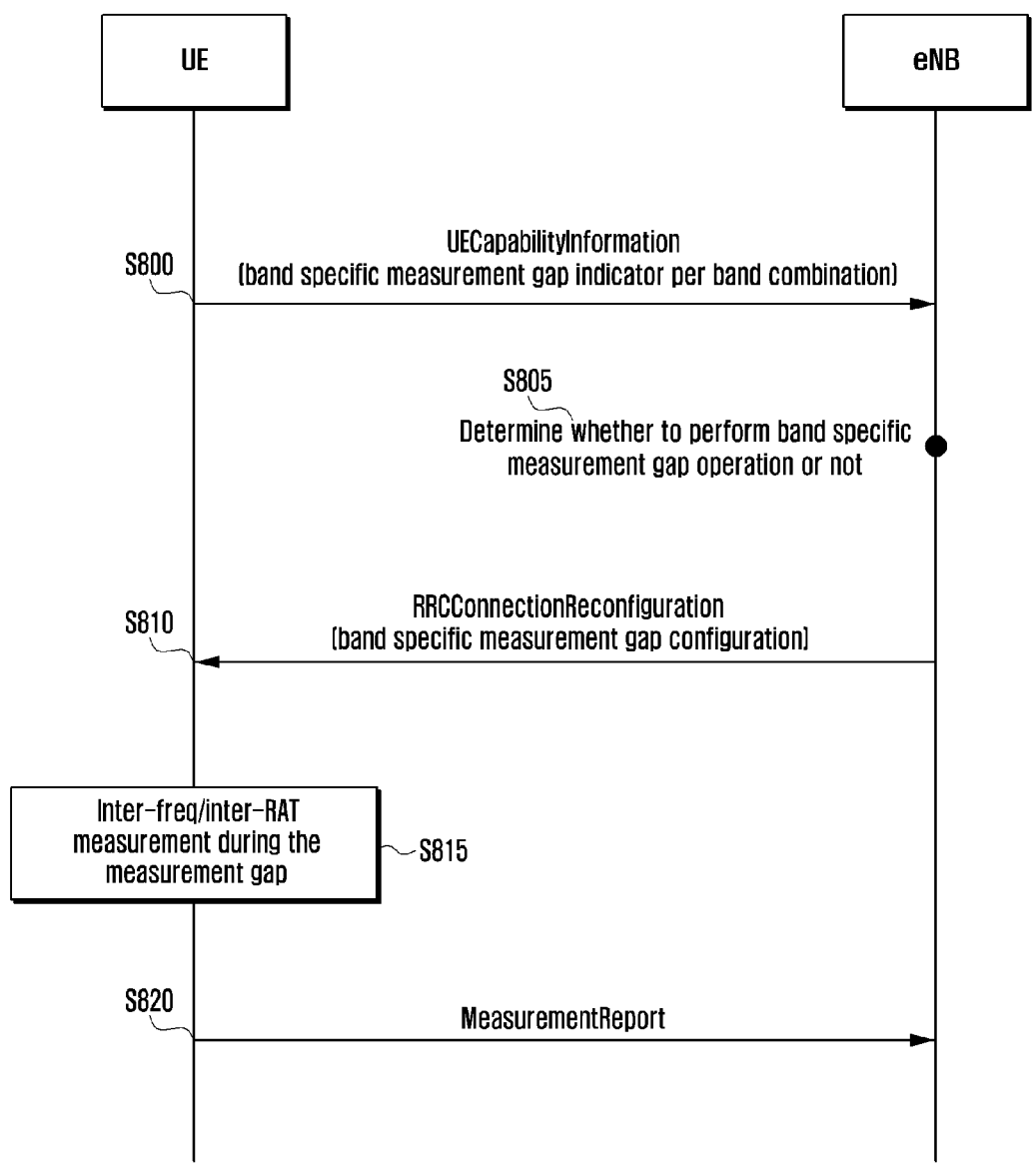
FIG. 8 is a flow chart that describes a process of controlling measurement gaps by frequency bands according to the present invention.

FIG. 8 is a flow chart that describes a process of controlling measurement gaps by frequency bands according to the present invention.

UE may provide at least one of the following two information items to ENB through a UE information message, UECapabilityInformation (S800). One information item indicates a state as to whether measurement gap is required when UE measures a specific frequency band by a combination of bands. Another information item indicates a state as to whether band-specific measurement gap operation can be performed based on a combination of frequency bands, i.e., a state as to whether measurement gap configuration can be performed for a plurality of frequency bands, respectively.

ENB determines whether to configure measurement gap and whether to perform band-specific measurement gap operation, referring to the performance of UE (S805). ENB transmits band-specific measurement gap configuration information to UE through an RRC connection reconfiguration message, RRCConnectionReconfiguration (S810).

The measurement gap configuration information transmitted from ENB to UE includes: an identifier indicating a band (or serving cell) to which measurement gap will be applied; and MGRP period information and gap offset values that will be used to calculate a begging time point of a measurement gap that will be applied to respective measurement gap operations. The measurement gap configuration information may also include Gap offset values applied to measurement gap operations of all bands or serving cells and MGRP period information.

UE perform measurement gap related operations (S815). The measurement gap related operations that UE performs with carrier aggregation will be described in detail referring to FIG. 9.

UE reports measured information to ENB by using a measurement report message, MeasurementReport (S820).

Figure 9:
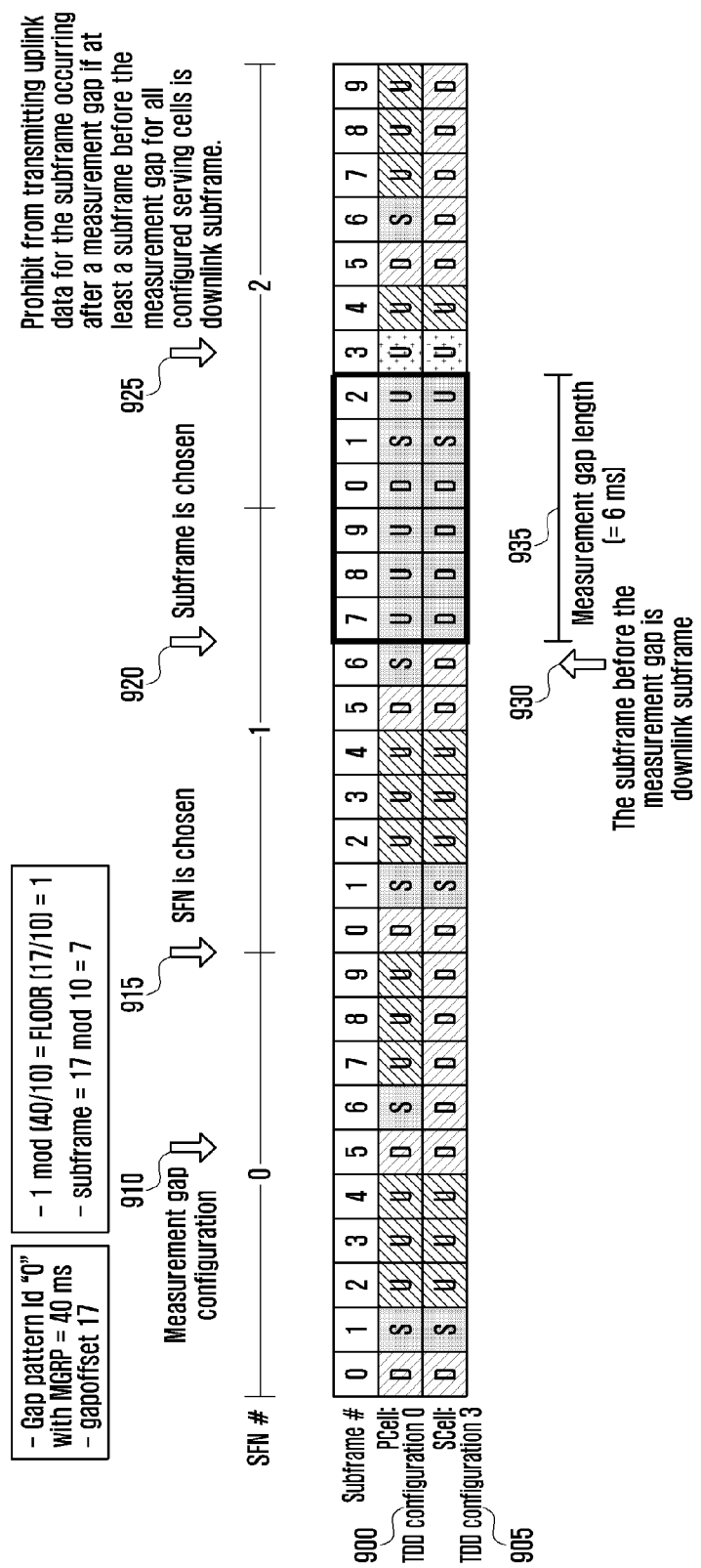
FIG. 9 is a view that describes measurement gap operation by applying carrier aggregation.

FIG. 9 is a view that describes measurement gap operation by applying carrier aggregation. Carriers using different RF modules may manage measurement gaps, independently and respectively. Therefore, the embodiment of FIG. 9 is applied to carriers controlled by one RF module.

Two carriers that belong to a single frequency band (or that belong to frequency bands adjacent to each other, correspondingly) use a single RF module, where one configures a primary carrier PCell 900 and the other configures a secondary carrier SCell 905. The present invention provides a method of determining whether to restrict reverse transmission after the measurement gap is ended for a case where TDD configurations of PCell and SCell differ from each other.

At a time point 910, UE receive measurement gap configuration information through a radio frame of SFN=0. The measurement gap configuration information includes information in which the measurement gap has a 'gp0' pattern and the gap offset value is set to 17.

The number of the radio frame performed in the measurement gap is determined by Equation 1. The number of the radio frame number derived by Equation 1 is 1 which is consistent with the SFN of the next radio frame, i.e., 1. Therefore, a measurement gap will start at a time point 915 in a radio frame with SFN=1.

In addition, the number of the subframe at which a measurement gap starts is calculated by Equation 2. Since the number of the subframe calculated by Equation 2 is seven, a measurement gap starts at a time point 920 from the $7^{th}$ subframe in a radio frame with SFN=1. The measurement gap length, labeled by reference number 935, is 6 ms; that is, the measurement gap length 935 is fixed as 6 subframes. UE performs measurement of inter-frequency or inter-RAT networks during the measurement gap 935.

Transmission of a subframe by UE at 925 after the measurement gap 935 is restricted according specific condition. As described above, if a subframe right before the beginning of a measurement gap is a downlink subframe, transmission of data from UE to ENB is restricted in the subframe after the end of the measurement gap.

Referring to FIG. 9, a subframe at 930 right before the beginning of a measurement gap is not a downlink subframe but a special subframe S in the PCell 900. In contrast, since a subframe at 930 right before the beginning of a measurement gap is a downlink subframe D in the SCell 905, this corresponds to the restriction of reverse transmission described above.

Therefore, when considering a plurality of carriers, operations of UE need to be newly defined to apply a measurement gap. The present invention is designed in such a way that, if at least one of a plurality of frequency bands, i.e., serving cells, set to apply the same measurement gap satisfies the restriction of reverse transmission described above, that is, a subframe at 920 right before the beginning of a measurement gap is a downlink subframe, reverse transmission is restricted in a subframe at 925 after the end of the measurement gap in all serving cells to which the same measurement gap is applied.

More specifically, when UE receives measurement gap configuration information from ENB, it identifies a group of serving cells to which measurement gap will be applied. For example, a group of serving cells to which measurement gap will be applied are serving cells specifically designated by ENB or serving cells configured to a frequency band specifically designated by ENB. In the following description, for the sake of convenience, serving cells to which measurement gap will be applied are called a 'measurement gap set.'

UE applies measurement gap to a measurement gap set. When the measurement gap is ended, UE checks whether there are activated serving cells in the measurement gap set. When there are activated serving cells in the measurement gap set, UE checks whether there is a serving cell where a subframe right after the measurement gap is a reverse subframe among from the activated serving cells.

If the conditions are satisfied (i.e., at least one of the serving cells that belong to the measurement gap set is activated and a subframe right after the measurement gap is a reverse subframe), UE determines whether there is any serving cell, in which a subframe right before the measurement gap is a forward subframe, from among the activated serving cells of the measurement gap set. If UE ascertains that there is any serving cell, in which a subframe right before the measurement gap is a forward subframe, from among the activated serving cells of the measurement gap set, it prohibits the reverse transmission through a subframe right after the measurement gap in the activated serving cells of the measurement gap set.

Figure 10:
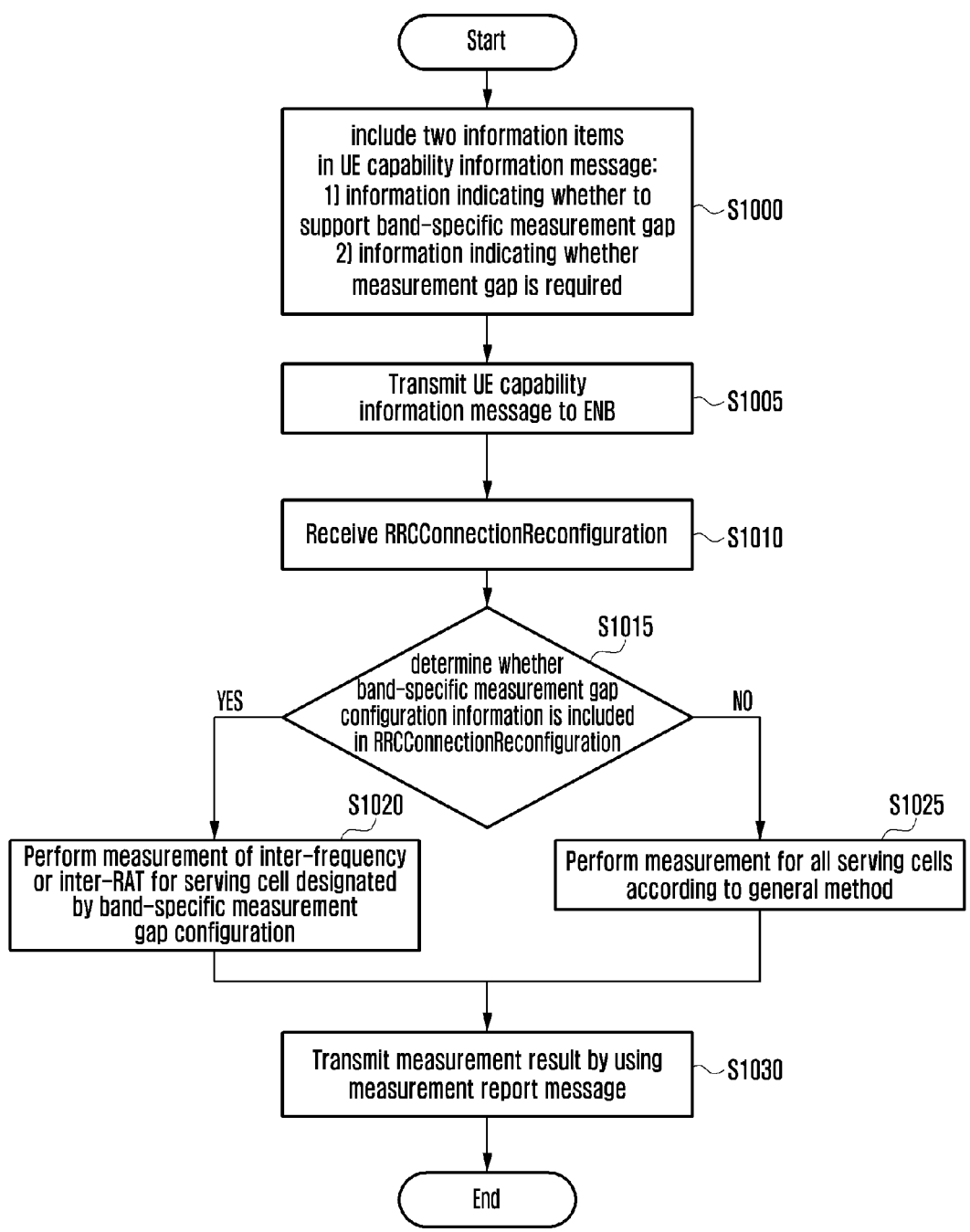
FIG. 10 is a flow chart that describes a process of performing a measurement by applying a measurement gap by UE, according to the present invention.

FIG. 10 is a flow chart that describes a process of performing a measurement by applying a measurement gap by UE, according to the present invention.

UE includes two information items in a UE capability information message to be transmitted to ENB (S1000). As described above, one information item indicates a state as to whether measurement gap is required when UE measures a specific frequency band by a combination of bands. Another information item indicates a state as to whether band-specific measurement gap operation can be performed based on a combination of frequency bands.

UE transmits UE capability information message to ENB (S1005). UE receives RRCConnectionReconfiguration from ENB (S1010). UE determines whether band-specific measurement gap configuration information is included in the RRCConnectionReconfiguration (S1015). The measurement gap configuration information includes: an identifier indicating a band (or serving cell) to which measurement gap will be applied; and MGRP period information and gap offset values that will be used to calculate a beginning time point of a measurement gap that will be applied to respective measurement gap operations.

When UE ascertains that band-specific measurement gap configuration information is included in the RRCConnectionReconfiguration in operation S1015, it performs measurement gap related operation for only designated serving cells by using measurement gap configuration information (S1020).

On the contrary, when UE ascertains that band-specific measurement gap configuration information is not included in the RRCConnectionReconfiguration in operation S1015, it performs measurement gap related operation according to general methods (S1025). UE reports measured information to ENB through a measurement report message, MeasurementReport, (S1030).

Figure 11:
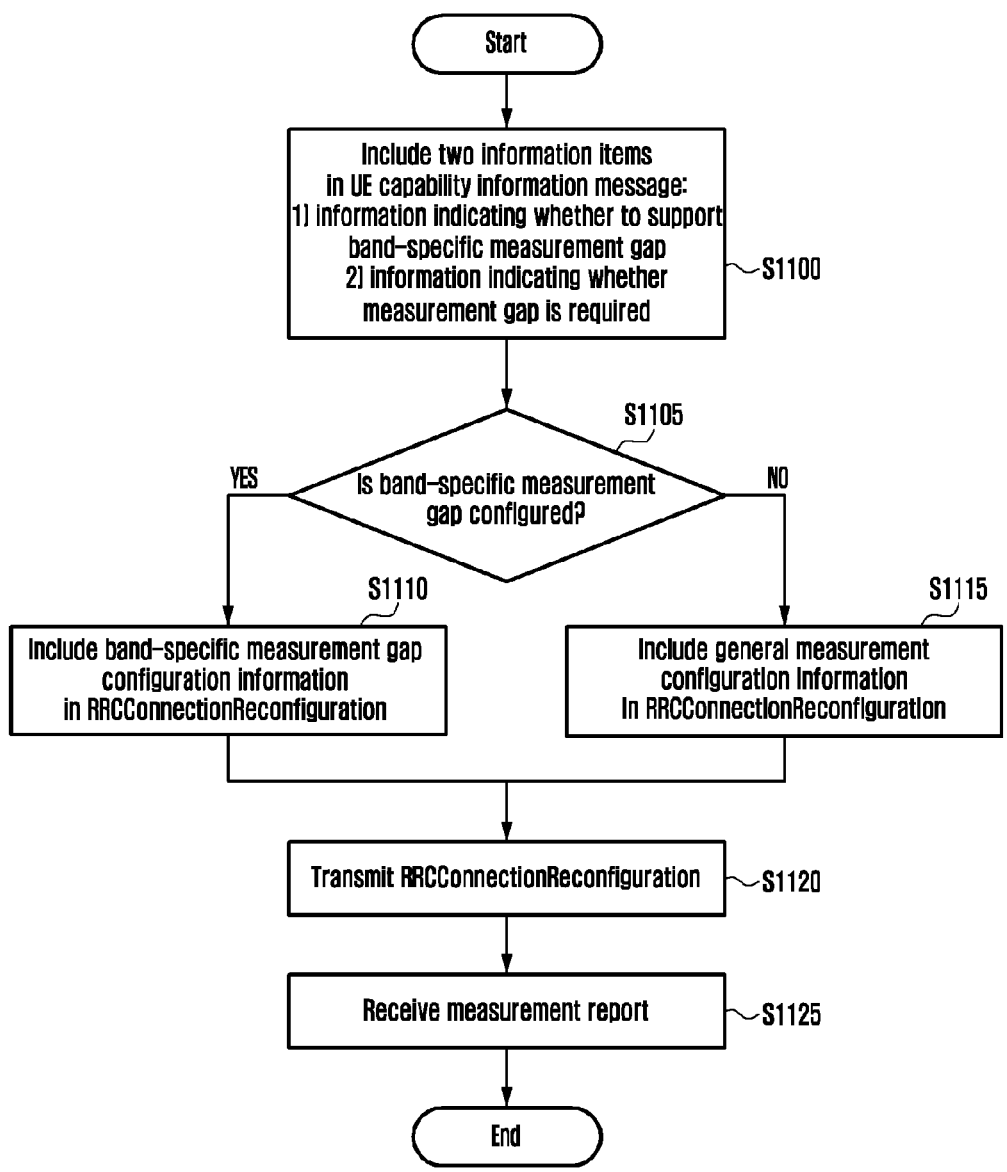
FIG. 11 is a flow chart that describes a process of controlling measurement gap configuration in UE by eNB, according to the present invention.

FIG. 11 is a flow chart that describes a process of controlling measurement gap configuration in UE by ENB, according to the present invention.

ENB receives, from UE, the UE capability information message including two information items described above (S1100). ENB determines whether to configure band-specific measurement gap to the ENB (S1105).

When ENB determines to configure band-specific measurement gap to the ENB in S1105, it includes band-specific measurement gap configuration information in an RRC connection reconfiguration message, RRCConnectionReconfiguration (S1110). The band-specific measurement gap configuration information includes: an identifier indicating a band (or serving cell) to which measurement gap will be applied; and MGRP period information and gap offset values that will be used to calculate a beginning time point of a measurement gap that will be applied to respective measurement gap operations.

On the contrary, when ENB determines not to configure band-specific measurement gap to the ENB in S1105, it includes general measurement gap configuration information in an RRC connection reconfiguration message, RRCConnectionReconfiguration (S1115).

ENB transmits the RRCConnectionReconfiguration to UE (S1120). ENB receives a measurement report message, MeasurementReport, including the measured information from UE (S1125).

Figure 12:
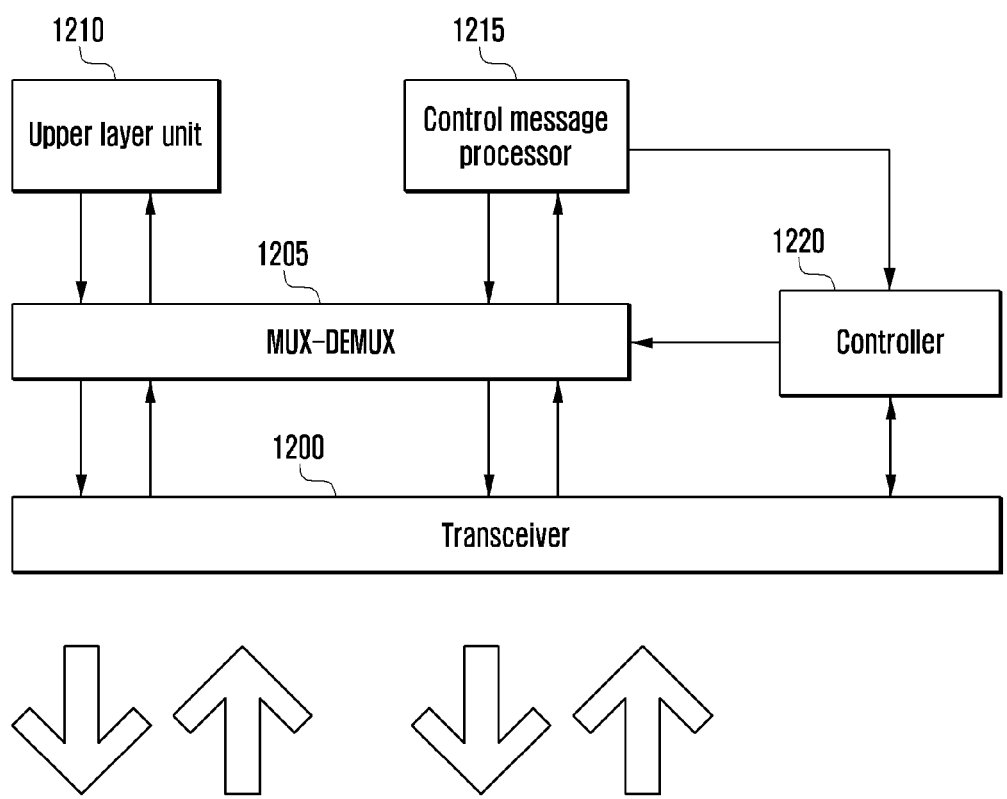
FIG. 12 is a schematic block diagram of UE according to the present invention.

FIG. 12 is a schematic block diagram of UE according to the present invention.

UE allows for transmission/reception of data to/from the upper layer unit 1210 and transmission/reception of control messages through the control message processor 1215. When UE transmits control signals or data to ENB, data is multiplexed through the MUX 1205 and transmitted through the transmitter 1200 under the control of the controller 1220. In contrast, when UE receives control signals or data from ENB, physical signals are received through the receiver 1200, de-multiplexed through the DEMUX 1205 and transferred to the upper layer unit 1210 or the control message processor 1215 according to types of messages, under the control of the controller 1220.

UE adapted to the measurement method according to the present invention: creates a UE capability information message including two information items described above through the control message processor 1215, multiplexes the message through the MUX 1205, and transmits the multiplexed result to ENB through the transmitter 1200 under the control of the controller 220. In addition, when UE receives an RRC connection reconfiguration message including measurement gap configuration information from ENB through the receiver 1200, it de-multiplexes the received message through the DEMUX 1205 and processes the de-multiplexed result through the control message processor 1215.

Figure 13:
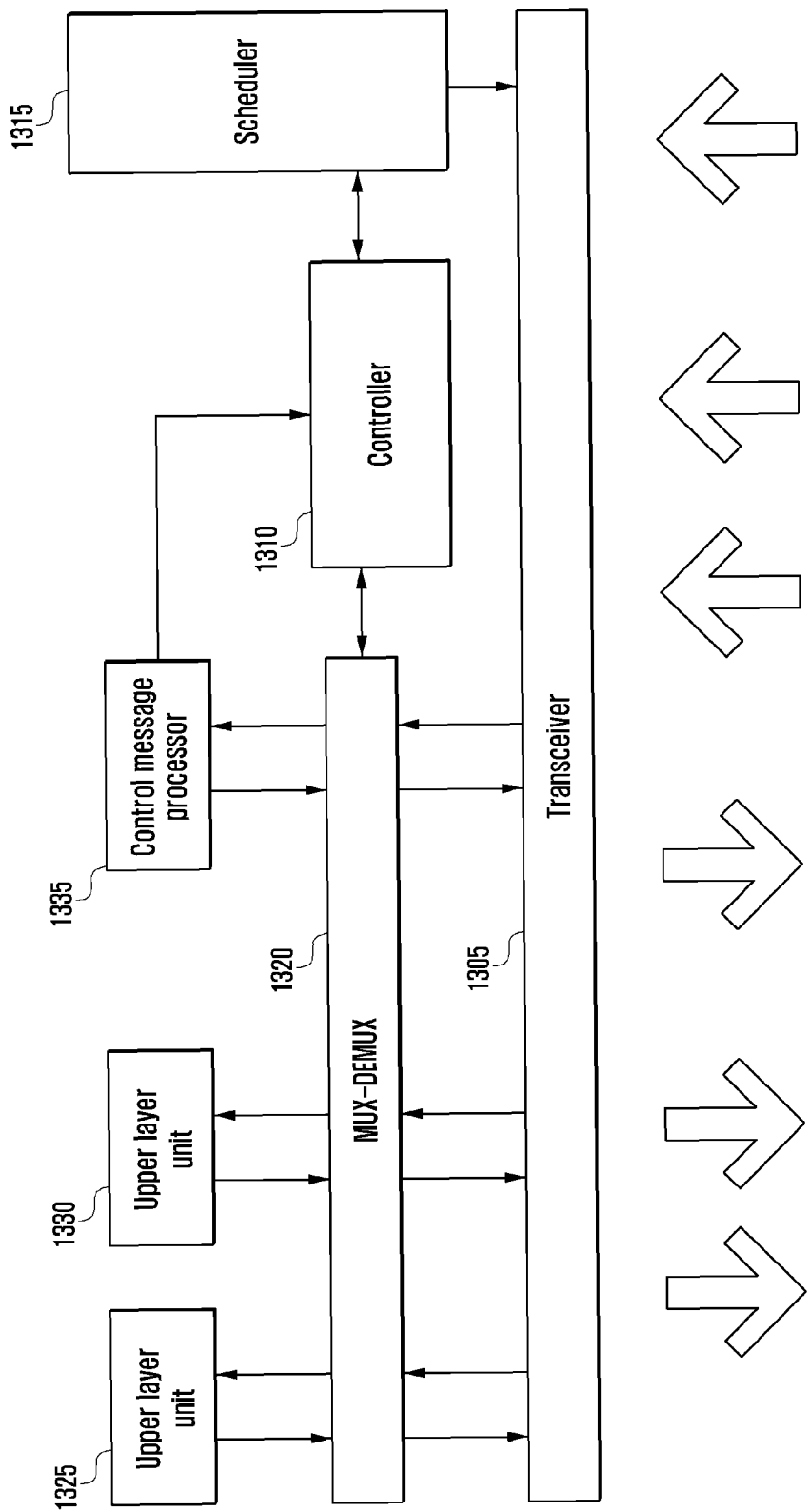
FIG. 13 is a schematic block diagram of eNB according to the present invention.

FIG. 13 is a schematic block diagram of ENB according to the present invention. ENB includes a transceiver 1305, a controller 1310, a MUX-DEMUX 1320, a control message processor 1335, upper layer units 1325 and 1330 and a scheduler 1315.

The transceiver 1305 transmits data and control signals via forward carriers. The transceiver 1305 receives data and control signals via reverse carriers. When a plurality of carriers are configured, the transceiver 1305 transmits/receives data and control signals via the plurality of carriers.

The MUX-DEMUX 1320 multiplexes data from the upper layer units 1325 and 1330 or the control message processor 1335 or de-multiplexes data received by the transceiver 1305 and transfers it to the upper layer units 1325 and 1330, the control message processor 1335 or the controller 1310. The controller 1310 determines whether to apply band-specific measurement gap to particular UE and determines whether to include measurement gap configuration information in a message, RRCConnectionReconfiguration.

The control message processor 1335 creates RRCconnectionReconfiguration to be transmitted UE and transfers it to the lower layers, under the control of the controller 1310.

The upper layer units 1325 and 1330 may be configured, according to types of UE, types of service. The upper layer units 1325 and 1330 process data created through user services such as FTP, VoIP, etc., and transfer it to the MUX-DEMUX 1320. The upper layer units 1325 and 1330 process data from the MUX-DEMUX 1320, and transfer it to service applications of the upper layers.

The scheduler 1315 allocates transmission resources to UE at proper time points, considering the buffer status of UE, channel status, active time of UE, etc., and allows the transceiver 1305 to process signals transmitted from UE or to transmit signals to UE.

As described above, the present invention can configure measurement gaps so that they are identical to/different from each other, with respect to serving cells having different TDD configuration information in a carrier aggregation technology of a mobile communication system, and can effectively configure a state as to whether to restrict reverse transmission after the measurement gaps.

While the present invention has been described with reference to such noted embodiments, methods, illustrations and examples, it is understood by a skilled artisan that the invention is not limited to any of the disclosed embodiments, methods, illustrations and examples, but by all embodiments, methods, illustrations and examples within the spirit and scope of the invention. The scope of the following claims, and the principles and novel features, amongst the discourse herein, is to be accorded the broadest interpretation so as to encompass all modifications, combinations, improvements and equivalent structures and functions.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A measurement method by a terminal in a mobile communication system comprising:
   transmitting, to a base station, a terminal information message including information for configuring measurement gaps with respect to a plurality of frequency bands;
   receiving, from the base station, measurement gap configuration information determined based on information included in the terminal information message, the measurement gap configuration information indicating at least two frequency bands to which a same measurement gap will be applied;
   performing a measurement for the at least two frequency bands based on the measurement gap configuration information; and
   transmitting, to the base station, data in a subframe after the same measurement gap according to time division duplexing (TDD) configurations for the at least two frequency bands.

2. The method of claim 1, wherein the terminal information message comprises:
   information indicating whether the terminal configures the respective measurement gaps for the plurality of frequency bands and whether the measurement gaps need to be set for the plurality of frequency bands.

3. The method of claim 1, further comprising:
   determining whether, for the at least two frequency bands with the same measurement gap set by the measurement gap configuration information, a subframe right after the same measurement gap is an uplink subframe and a subframe right before the same measurement gap is downlink subframe; and
   performing a process so as not to transmit data to the base station in the subframe right after the same measurement gap.

4. The method of claim 1, wherein the measurement gap configuration information comprises:

information to calculate a beginning point of the same measurement gap in a radio frame.

5. The method of claim 1, further comprising:
transmitting a report message including measured result to the base station.

6. A method of controlling measurement gap configuration of a terminal by a base station in a mobile communication system comprising:
receiving, from the terminal, a terminal information message including information that the terminal uses to configure measurement gaps with respect to a plurality of frequency bands;
transmitting, to the terminal, measurement gap configuration information determined based on information included in the terminal information message, the measurement gap configuration information indicating at least two frequency bands to which a same measurement gap will be applied; and
receiving, from the terminal, data in a subframe after the same measurement gap according to time division duplexing (TDD) configurations for the at least two frequency bands.

7. The method of claim 6, wherein the terminal information message comprises:
information indicating whether the terminal configures the respective measurement gaps for the plurality of frequency bands and whether the measurement gaps need to be set for the plurality of frequency bands.

8. The method of claim 6, wherein the measurement gap configuration information comprises:
information to calculate a beginning point of the same measurement gap in a radio frame.

9. The method of claim 6, further comprising:
receiving a report message including measured result from the terminal.

10. A measurement apparatus in a mobile communication system comprising:
a transceiver configured to transmit and receive messages and data; and
a controller coupled with the transceiver and configured to:
transmit, to a base station, a terminal information message including information for configuring measurement gaps with respect to a plurality of frequency bands,
receive, from the base station, measurement gap configuration information determined based on information included in the terminal information message, the measurement gap configuration information indicating at least two frequency bands to which a same measurement gap will be applied,
perform a measurement for the at least two frequency bands based on the measurement gap configuration information, and
transmit, to the base station, data in a subframe after the same measurement gap according to time division duplexing (TDD) configurations for the at least two frequency bands.

11. The apparatus of claim 10, wherein the terminal information message comprises:
information indicating whether a terminal configures the respective measurement gaps for the plurality of frequency bands and whether the measurement gaps need to be set for the plurality of frequency bands.

12. The apparatus of claim 10, where the controller is further configured to determine that, for the at least two frequency bands with the same measurement gap set by the measurement gap configuration information, a subframe right after the same measurement gap is an uplink subframe and a subframe right before the same measurement gap is downlink subframe, and
perform a process so as to not to transmit data to the base station in the subframe right after the same measurement gap.

13. The apparatus of claim 10, wherein the measurement gap configuration information comprises:
information to calculate a beginning point of the same measurement gap in a radio frame.

14. The apparatus of claim 10, wherein the controller is further configured to transmit a report message including a measured result to the base station.

15. An apparatus for controlling measurement gap configuration of a terminal in a mobile communication system comprising:
a transceiver configured to transmit and receive messages and data; and
a controller coupled with the transceiver and configured to:
receive, from a terminal, a terminal information message including information that the terminal uses to configure measurement gaps with respect to a plurality of frequency bands, and
transmit, to the terminal, measurement gap configuration information determined based on information included in the terminal information message, the measurement gap configuration information indicating at least two frequency bands to which a same measurement gap will be applied, and
receive, from the terminal, data in a subframe after the same measurement gap according to time division duplexing (TDD) configurations for the at least two frequency bands.

16. The apparatus of claim 15, wherein the terminal information message comprises:
information indicating whether the terminal configures the respective measurement gaps for the plurality of frequency bands and whether the measurement gaps need to be set for the plurality of frequency bands.

17. The apparatus of claim 15, wherein the measurement gap configuration information comprises:
information to calculate a beginning point of the same measurement gap in a radio frame.

18. The apparatus of claim 15, wherein the transceiver is further configured to receive a report message including a measured result from the terminal.

* * * * *